United States Patent
Suto et al.

(10) Patent No.: US 7,536,095 B2
(45) Date of Patent: May 19, 2009

(54) AUTOFOCUS DEVICE AND METHOD

(75) Inventors: Hidekazu Suto, Tokyo (JP); Yujiro Ito, Kanagawa (JP); Shinji Takemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 11/403,186

(22) Filed: Apr. 12, 2006

(65) Prior Publication Data

US 2006/0232699 A1    Oct. 19, 2006

(30) Foreign Application Priority Data

Apr. 15, 2005  (JP) .......................... P2005-119036

(51) Int. Cl.
*G03B 13/32* (2006.01)
*G03B 3/00* (2006.01)
*H04N 5/222* (2006.01)
*G03B 13/00* (2006.01)

(52) U.S. Cl. ..................... 396/90; 396/125; 348/333.03; 348/345

(58) Field of Classification Search ............. 396/89–91, 396/106, 125, 130, 133, 135, 301, 302, 529, 396/531, 532; 250/201.2; 348/345, 347
See application file for complete search history.

(56) References Cited

U.S. PATENT DOCUMENTS 5,315,339 A      5/1994   Hamada et al. ............. 396/130
6,029,017 A *    2/2000   Miyazawa et al. .......... 396/532
6,308,015 B1    10/2001   Matsumoto .................. 396/106
6,624,402 B2 *   9/2003   Kaneko et al. ........... 250/201.2
6,750,914 B2 *   6/2004   Sannoh et al. .............. 348/346
7,098,954 B2 *   8/2006   Suda et al. .................. 348/347
2004/0091254 A1  5/2004   Shiraishi ...................... 396/125

FOREIGN PATENT DOCUMENTS

EP       0 762 742       3/1997
JP       10-213736       8/1998

* cited by examiner

*Primary Examiner*—Melissa J Koval
(74) *Attorney, Agent, or Firm*—Frommer Lawrence & Haug LLP; William S. Frommer; Thomas F. Presson

(57) ABSTRACT

An autofocus device comprising a lens-driving unit, a focal-point-position-detecting unit that detects a position of a focal point of the lens, a distance measurement sensor that measures a distance to a subject, and a focus-evaluation-value-calculating unit that calculates a focus evaluation value using a frequency component of an image signal in a particular region in an imaging frame. The device also has a user interface and a control unit that controls the lens-driving unit to drive the lens based on the focus evaluation value or the focus evaluation value, the position of a focal point of the lens, and a measured distance result measured by the distance measurement sensor, thereby meeting the position of the focal point to an in-focus position. The control unit controls the lens-driving unit, the distance measurement sensor and the focus-evaluation-value-calculating unit based on the autofocus contents set by the user interface.

9 Claims, 10 Drawing Sheets

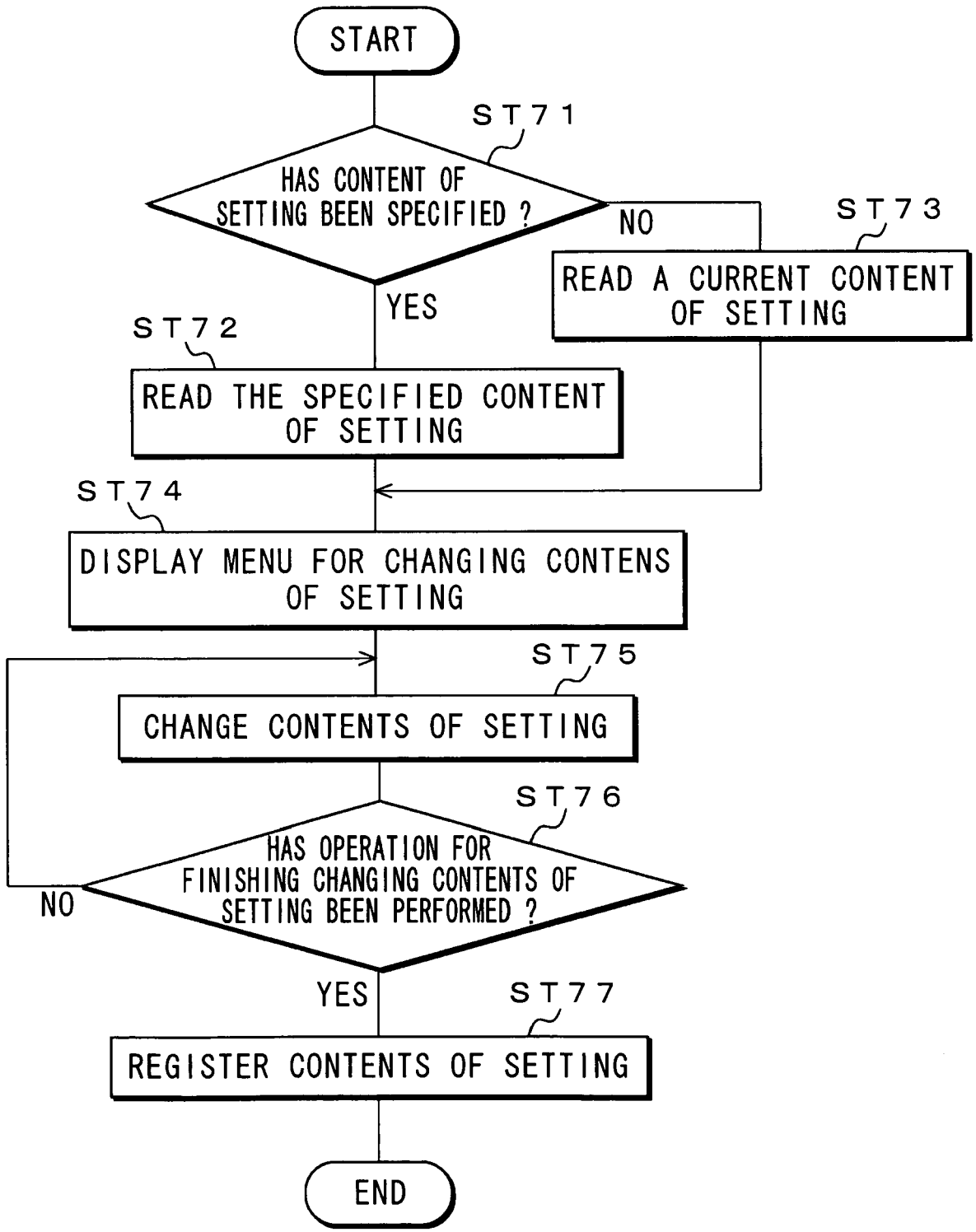

AUTOFOCUS DEVICE AND METHOD

CROSS REFERENCE TO RELATED APPLICATION

The present invention contains subject matter related to Japanese Patent Application No. JP2005-119036 filed in the Japanese Patent Office on Apr. 15, 2005, the entire contents of which being incorporated herein by reference.

BACKGROUND OF THE INVENTION

1. Field of the Invention

This invention relates to autofocus device and method and a program product therefor, which are used in an imaging apparatus.

2. Description of Related Art

The imaging apparatus such as a video camera and a digital still camera has been equipped with any autofocus mechanism that automatically focuses on a subject. The autofocus mechanism calculates focus evaluation values using frequency components of an image signal in a particular region that is provided in an imaging frame (finder's view) to and drives a focus lens so that the maximum focus evaluation value can be given (see Japanese Patent Application Publication No. H10-213736). Thus, if imaging after such the particular region is set on a center of the imaging frame and a composition of the imaging frame is fixed to put the subject on the center of the imaging frame, it is possible to focus on the subject automatically when a position of a focal point of the focus lens meets an in-focus position thereof.

SUMMARY OF THE INVENTION

An imaging apparatus for broadcasting or professional use has various kinds of performances in autofocus operations that are necessary for contents of their services. For example, a called weather camera for imaging a landscape to grasp a weather therearound is fixedly set on a tall tower or a roof of a tall building and is successively utilized in the whole day. This strongly requests the imaging apparatus for a long life cycle thereof but does not particularly request it for focus adjustment performance when vibrations of the camera and the like occur. Further, this does not particularly request it for a quick start of autofocus operation, a period of focusing time, and the like.

On the other hand, an imaging apparatus for using a sports program, a new program and the like is not successively utilized in the whole day. This does not strongly request it for a long life cycle thereof as compared with the weather camera. However, a quick start of autofocus operation, a period of focusing time, and the like are strongly requested for the imaging apparatus for using a sports program and the like in order to release the shatter at right moment. In such the imaging apparatus, handy typed ones are used very often. This also strongly requests them for focus adjustment performance when vibrations of the camera and the like occur.

In an imaging apparatus for motion-picture production, it is necessary to image a high-grade image. This strongly requests it for focus accuracy as compared with a period of focusing time, a high-grade image up to an in-focus, and a smoothly focusing operation.

Thus, such the requests for autofocus operation vary according to contents of service for which the imaging apparatus is used. If the imaging apparatuses each specializing any contents of their services are separately manufactured and distributed, it is difficult to present an inexpensive image apparatus because of a small-lot production of a wide variety of products therefor.

It is desirable to present autofocus device and method and a program product therefor that can perform any autofocus operations according to various uses.

According to an embodiment of the present invention, there is provided autofocus device having a lens-driving unit that drives a lens, a focal-point-position-detecting unit that detects a position of a focal point of the lens, and a distance measurement sensor that measures a distance to a subject. The device also has a focus-evaluation-value-calculating unit that calculates a focus evaluation value using a frequency component of an image signal in a particular region that is provided in an imaging frame and a user interface that sets an autofocus content. The device further has a control unit that performs a focus operation to control the lens-driving unit to drive the lens based on the focus evaluation value or the focus evaluation value, the position of a focal point of the lens, and a measured distance result measured by the distance measurement sensor, thereby meeting the position of the focal point of the lens detected by the focal-point-detecting unit to an in-focus position thereof. The control unit controls the lens-driving unit, the distance measurement sensor and the focus-evaluation-value-calculating unit based on the autofocus content set by the user interface, thereby achieving a focus operation according to the set content.

According to another embodiment of the present invention, there is provided an autofocus method. The method includes a focal-point-position detecting step of detecting a position of a focal point of a lens, a distance-measuring step of measuring a distance to a subject, and a focus-evaluation-value-calculating step of calculating a focus evaluation value using a frequency component of an image signal in a particular region that is provided in an imaging frame. The method also includes a lens-driving step of performing a focus operation to drive the lens based on any of the focus evaluation value as well as the focus evaluation value, the position of a focal point of the lens, and a measured distance result measured by the distance measurement sensor, thereby meeting the position of the focal point of the lens detected by the focal-point-detecting unit to an in-focus position thereof. The method further includes an operation-switching step of switching the lens-driving step, the distance measurement step and the focus-evaluation-value-calculating step from one another based on the autofocus content set by the user interface, thereby achieving a focus operation according to the set contents.

According to further embodiment of the present invention, there is provided a computer program product that allows a computer to execute the above autofocus method.

In any embodiments of the invention, a speed of driving the lens, a size of distance measurement window of the distance measurement sensor, a restart determination standard as restarting the focusing operation, a lens-drive processing using the measured distance result by the distance measurement sensor, a lens-drive processing without using the measured distance result by the distance measurement sensor and the like are controlled based on the autofocus content set by the user interface, thereby achieving a focus operation according to any set autofocus contents. Further, a storage unit stores one or plural autofocus contents set by the user interface and by reading any autofocus contents out of the storage unit, the focusing operations are switched.

Thus, according to any embodiments of the invention, it is possible to control the lens-driving unit, the distance measurement sensor and the focus-evaluation-value-calculating unit based on the autofocus contents set by the user interface, thereby achieving a focus operation according to the set autofocus content. Therefore, if the autofocus contents are set according to any uses of the imaging apparatus by the user interface, it is possible to perform any autofocus operations according to any uses.

The concluding portion of this specification particularly points out and directly claims the subject matter of the present invention. However those skills in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 11 is a flowchart for showing setting-contents-changing processing that changes contents of the setting, which have been already set.

DESCRIPTION OF THE PREFERRED EMBODIMENTS

Figure 1:
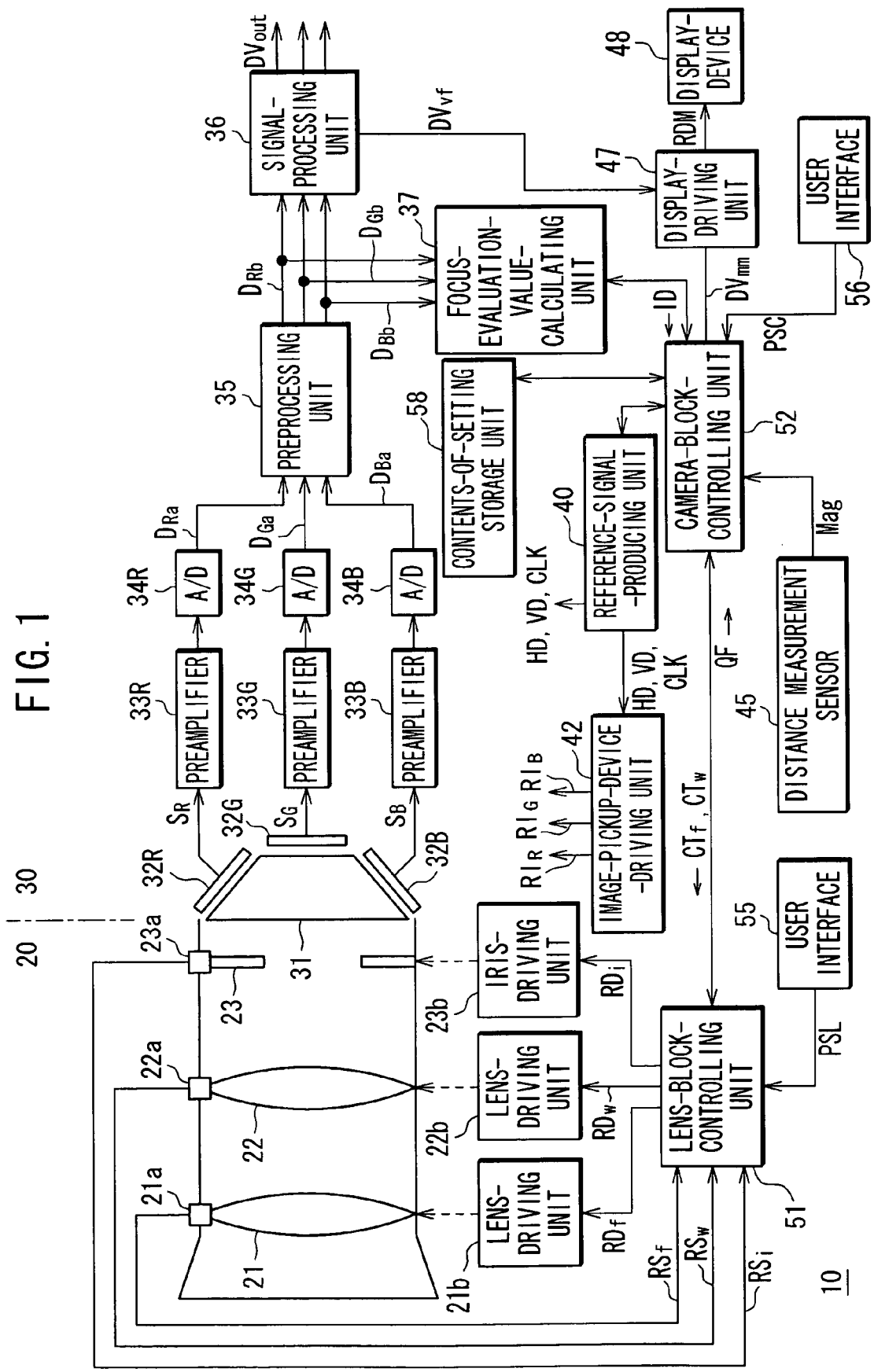
FIG. 1 is a block diagram for showing a configuration of an embodiment of a video camera according to the invention.

The following will describe embodiments of the invention with reference to the accompanying drawings. FIG. 1 shows a whole configuration of an imaging apparatus such as a video camera 10 having an autofocus mechanism.

A lens block 20 of the video camera 10 is constituted of an imaging lens, a lens-position-detecting unit that detects a position of the imaging lens, a lens-driving unit that drives the imaging lens and the like. It is to be noted that in the lens block 20 shown in FIG. 1, as the imaging lens, a focus lens 21 for focusing an image of subject on an imaging surface of an imaging element and a wobbling lens 22 for utilizing determination of a driving direction of the focus lens 21 to meet a position of its focal point to an in-focus position are illustrated.

For the focus lens 21, are provided a lens-position-detecting unit 21a that detects a position of the focus lens 21, i.e. a focal-point-position-detecting unit that detects a position of a focal point of the focus lens 21, and a lens-driving unit 21b that drives the focus lens 21 to move the lens position along its optical axis.

Similarly, for the wobbling lens 21, are provided a lens-position-detecting unit 22a that detects a position of the wobbling lens 22 and a lens-driving unit 22b that drives the wobbling lens 22 to move the lens position along its optical axis, in order to perform any suitable wobbling.

The lens block 20 has an iris 23 to control an amount of incident light. For the iris 23, also are provided an iris-position-detecting unit 23a that detects an opening level of an aperture of the iris 23 and an iris-driving unit 23b that drives the iris 23 so to be opened or shut.

A lens-block-controlling unit 51 receives a detection signal RSf indicating a position of a focal point of focus lens 21 from the lens-position-detecting unit 21a, a detection signal RSw indicating an amount of wobbling from the lens-position-detecting unit 22a, a detection signal RSi indicating an opening level of an aperture of the iris 23 from the iris-position-detecting unit 23a, respectively. The lens-block-controlling unit 51 is connected to a user interface 55 for setting an autofocus operation mode and starting an autofocus operation. According to user's manipulations of the user interface 55, the lens-block-controlling unit 51 can receive any manipulation signals PSL. The lens-block-controlling unit 51 can also have a storage unit, which is not shown, that is constituted of a read-only memory (ROM), an electrically erasable programmable read-only memory (EEPROM) or the like. The storage unit may store data on focal length of each of the focus lens 21 and the wobbling lens 22 and data on aperture ratio as well as any information on a manufacturer's name and serial number of the lens block, and the like.

The lens-block-controlling unit 51 generates lens-driving signals RDf, RDw based on the stored information, the detection signals RSf, RSw, and RSi, and the manipulation signals PSL as well as a focus-controlling signal CTf and a wobbling-controlling signal CTw that are received from a camera-block-controlling unit 52, which will be described later. The lens-block-controlling unit 51 further supplies the generated lens-diving signal RDf to the lens-driving unit 21b to drive the focus lens 21, thereby allowing a desired subject to be in focus. The lens-block-controlling unit 51 additionally supplies the generated lens-diving signal RDw to the lens-driving unit 22b to drive the wobbling lens 22, thereby allowing a direction of an in-focus position of the focus lens 21 to be detected. The lens-block-controlling unit 51 also generates an iris-controlling signal RDi and supplies it to the iris-driving unit 23b, thereby allowing the opening level of aperture of the iris 23 to be controlled.

A color separation prism 31 in a camera block 30 separates incident light from the lens block 20 into three primary colors of red (R), green (G), and blue (B) and supplies R component thereof to an image pickup device 32R, G component thereof to an image pickup device 32G, and B component thereof to an image pickup device 32B, respectively.

The image pickup device 32R generates an image signal SR corresponding to the R component by photoelectric conversion and supplies it to the preamplifier 33R. The image pickup device 32G generates an image signal SG corresponding to the G component by the photoelectric conversion and supplies it to the preamplifier 33G. The image pickup device 32B generates an image signal SB corresponding to the B component by the photoelectric conversion and supplies it to the preamplifier 33B.

The preamplifier 33R amplifies a level of the image signal SR, performs correlated dual sampling thereon to reduce any reset noise, and supplies the noise-reduced image signal SR to an A/D converter 34R. The A/D converter 34R receives the image signal SR, converts it into a digital image signal DRa, and supplies it to a preprocessing unit 35.

The preamplifier 33G amplifies a level of the image signal SG, performs correlated dual sampling thereon to reduce any reset noise, and supplies the noise-reduced image signal SG to an A/D converter 34G. The A/D converter 34G receives the image signal SG, converts it into a digital image signal DGa, and supplies it to the preprocessing unit 35.

The preamplifier 33B amplifies a level of the image signal SB, performs correlated dual sampling thereon to reduce any reset noise, and supplies the noise-reduced image signal SB to an A/D converter 34B. The A/D converter 34B receives the image signal SB, converts it into a digital image signal DBa, and supplies it to the preprocessing unit 35.

The preprocessing unit 35 receives the image signals DRa, DGa, and DBa to adjust their gains and to perform a stability of black level, an adjustment of dynamic range thereof and the like, generates image signals DRb, DGb, and DBb, and supplies the image signals DRb, DGb, and DBb thus generated to a signal-processing unit 36 and a focus-evaluation-value-calculating unit 37.

The signal-processing unit 36 receives the image signals DRb, DGb, and DBb to perform various kinds of signal processing on them, thereby generating image output signals DVout. For example, Knee compensation for compressing an image signal having a level over a set level, gamma correction for correcting a level of the image signal according to any various set gamma curves, and white and black clipping for limiting a level of the image signal to stay in a set region are performed. The signal-processing unit 36 also performs edge enhancement processing, linear matrix processing, encoding processing for generating the image output signal DVout having a desired format and the like.

The focus-evaluation-value-calculating unit 37 generates brightness signals DY based on the image signals DRb, DGb, and DBb received from the preamplifier 35 and calculates any focus evaluation values ID using the brightness signals DY. The focus-evaluation-value-calculating unit 37 then supplies the focus evaluation values ID to the camera-block-controlling unit 52.

Figure 2:
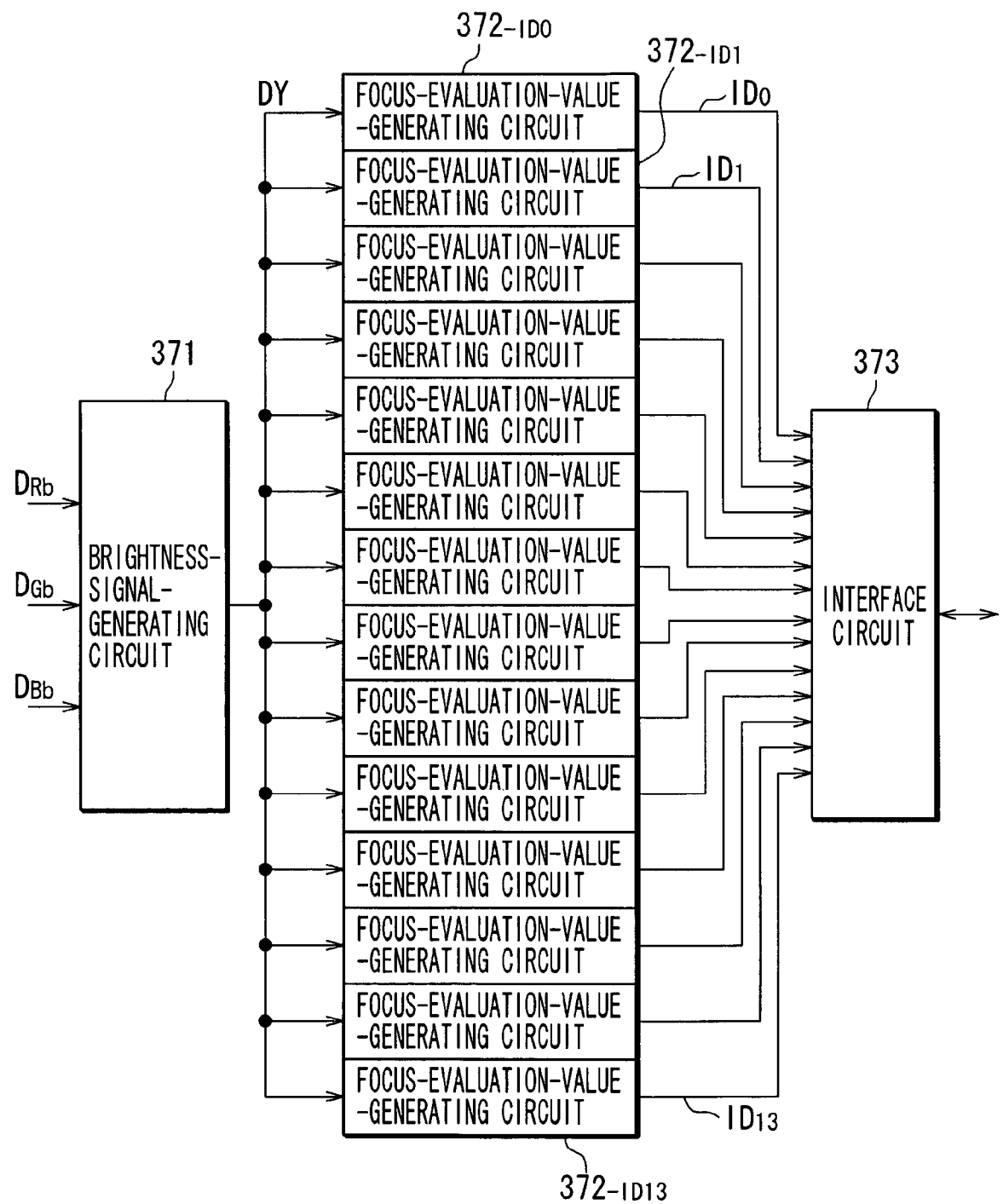
FIG. 2 is a block diagram for showing a configuration of a focus-evaluation-value-calculating unit.

FIG. 2 shows a configuration of the focus-evaluation-value-calculating unit 37. The focus-evaluation-value-calculating unit 37 has a brightness-signal-generating circuit 371 for generating the brightness signal DY based on the image signals DRb, DGb, and DBb, focus-evaluation-value-generating circuits 372-ID0 through 372-ID13 for generating fourteen kinds of focus evaluation values ID0 through ID13, which will be described later, and an interface circuit 373 for communicating with the camera-block-controlling unit 52 and supplying the generated focus evaluation values ID0 through ID13 to the camera-block-controlling unit 52 according to any request from the camera-block-controlling unit 52.

By using the image signals DRb, DGb, and DBb received from the preprocessing circuit 35, the brightness-signal-generating circuit 371 generates the brightness signal DY by calculation as follows:

$$DY=0.30DRb+0.59DGb+0.11DBb.$$

This is because it is adequate to determine whether a contrast is high or low in order to determine whether the focus is achieved and adequate to detect an alteration in level of the brightness signal DY as an alteration in the contrast.

The focus-evaluation-value-generating circuit 372-ID0 generates the following focus evaluation values ID0. Similarly, each of the focus-evaluation-value-generating circuits 372-ID1 through 372-ID13 generates the following focus evaluation values ID1 through ID13.

Focus evaluation value ID0: a name of focus evaluation value, "IIR1_W1_HPeak";

Focus evaluation value ID1: a name of focus evaluation value, "IIR1_W2_HPeak";

Focus evaluation value ID2: a name of focus evaluation value, "IIR1_W2_HPeak";

Focus evaluation value ID3: a name of focus evaluation value, "IIR4_W3_HPeak";

Focus evaluation value ID4: a name of focus evaluation value, "IIR0_W1_VIntg";

Focus evaluation value ID5: a name of focus evaluation value, "IIR3_W1_VIntg";

Focus evaluation value ID6: a name of focus evaluation value, "IIR1_W1_HIntg";

Focus evaluation value ID7: a name of focus evaluation value, "Y_W1_HIntg";

Focus evaluation value ID8: a name of focus evaluation value, "Y_W1_Satul";

Focus evaluation value ID9: a name of focus evaluation value, "IIR1_W3_HPeak";

Focus evaluation value ID10: a name of focus evaluation value, "IIR1_W4_HPeak";

Focus evaluation value ID11: a name of focus evaluation value, "IIR1_W5_HPeak";

Focus evaluation value ID12: a name of focus evaluation value, "Y_W3_HIntg; and

Focus evaluation value ID13: a name of focus evaluation value, "Y_W3_HIntg.

Herein, to the above focus evaluation values ID0 trough ID13, respectively, are applied the names of focus evaluation values indicating attributes thereof, "use data_a size of evaluation window_a calculation method of focus evaluation value". The evaluation window is a particular region that is provided in an imaging frame.

These focus evaluation values ID0 through ID13 are basically obtained by adding frequency components of an image signal together in the evaluation window and indicate values corresponding to any blurs in an image.

There are "IIR" and "Y" in the "use data" of the names of focus evaluation values. The "IIR" uses data on high frequency component that is filtered out of the brightness signal DY by using a high-pass filter (HPF). The "Y" uses frequency component of the brightness signal DY as it is without using any HPF.

When using HPF, an infinite impulse response (IIR) typed HPF may be used. Based on species of HPF, IIR is classified into IIR0, IIR1, IIR3, and IIR4, which represent HPFs having different cut-off frequencies. Setting HPF so as to have different cut-off frequencies allows an alteration in the focus evaluation values to be enlarged, for example, at a near position of in-focus position if an HPF having a high cut-off frequency is used, in contrast with a case where an HPF having a low cut-off frequency is used. If it is hardly focused, an alteration in the focus evaluation values can be enlarged when an HPF having a low cut-off frequency is used, in contrast with a case where an HPF having a high cut-off frequency is used. Thus, HPF can be set so as to have different cut-off frequencies, in order to select a most suitable focus evaluation value according to any focus situation during autofocus operations.

The size of evaluation window is a size of image region to be used for generating the focus evaluation value. In this embodiment, the sizes of the evaluation window illustrate the following five species of the sizes of the evaluation windows W1 through W5.

Size of evaluation window W1:116 pixels by 60 pixels;
Size of evaluation window W2:96 pixels by 60 pixels;
Size of evaluation window W3:232 pixels by 120 pixels;
Size of evaluation window W4:192 pixels by 120 pixels; and
Size of evaluation window W5:576 pixels by 180 pixels.

Figure 3:
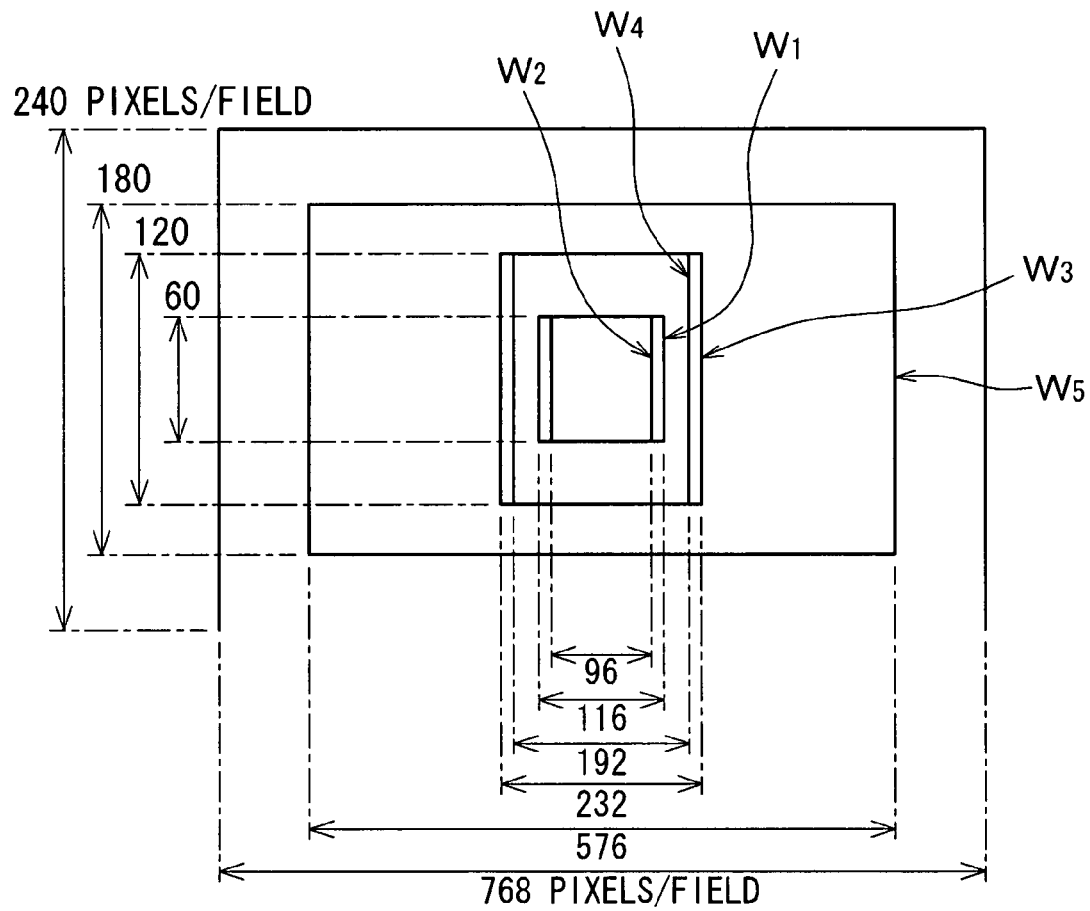
FIG. 3 is a diagram for showing sizes of evaluation windows.

A center of each of these evaluation windows aligns a center of imaging frame. It is to be noted that, in FIG. 3, the sizes of the evaluation windows W1 through W5 are illustrated in a case where a frame size of one field is 768 pixels by 240 pixels.

Thus, setting the evaluation windows so as to have a various kinds of sizes thereof allows to be produced any separate focus evaluation values that are suitable to any sizes of the evaluation windows. This enables any suitable focus evaluation values to be selected among the focus evaluation values ID0 through ID13 to meet whatever size target subject has.

As the calculation method of focus evaluation value, HPeak scheme, HIntg scheme, VIntg scheme, and Satul scheme may be illustrated. The HPeak scheme is a calculation method of horizontal direction focus evaluation values relative to any peaks. The HIntg scheme is a calculation method of horizontal direction focus evaluation values relative to any horizontal and vertical integration. The VIntg scheme is a calculation method of vertical direction focus evaluation values relative to any integration. The Satul scheme is a calculation method of calculating a number of pixels saturated in brightness thereof.

The HPeak scheme is also a calculation method of focus evaluation values for obtaining any high frequency component from a horizontal direction image signal using HPF. In this embodiment, it is used for calculating the focus evaluation values ID0, ID1, ID2, ID3, ID9, ID10, and ID11.

Figure 4:
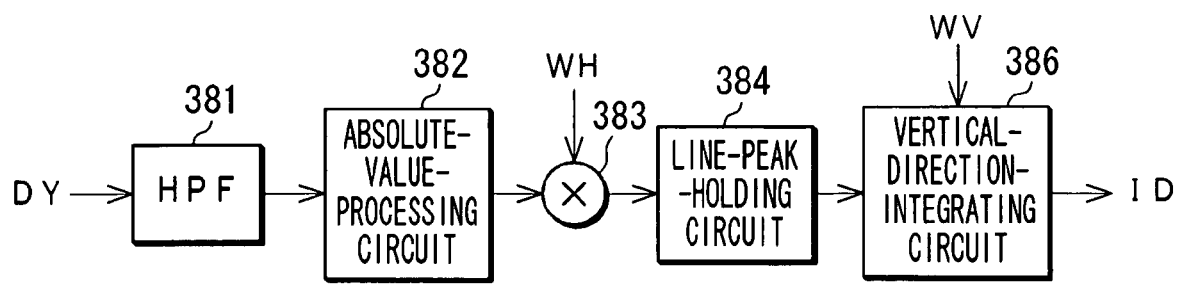
FIG. 4 is a block diagram for showing a configuration of a calculation filter for filtering a horizontal direction focus evaluation value.

FIG. 4 shows a configuration of a calculation filter for filtering a horizontal direction focus evaluation value to be used for the HPeak scheme, which may be used in the focus-evaluation-value-calculating unit 37. This calculation filter for filtering a horizontal direction focus evaluation value has an HPF 381 for filtering only high frequency components out of brightness signal DY from a brightness-signal-generating circuit, an absolute-processing circuit 382 for computing an absolute of these high frequency components, a multiplication circuit 383 for multiplying the absolute of these high frequency components by a horizontal direction window control signal WH, a line-peak-holding circuit 384 for holding a peak value per one line, and a vertical-direction-integrating circuit 386 for vertically integrating peak values of all the lines within the evaluation window.

The HPF 381 filters high frequency components out of the brightness signal DY and the absolute-processing circuit 382 computes an absolute of these high frequency components.

The multiplication circuit 383 multiplies the absolute by the horizontal direction window control signal WH to obtain an absolute value of the high frequency components within the evaluation window. In other words, if supplying to the multiplication circuit 383 a window control signal WH of which a multiplied value becomes zero out of the evaluation window, it is possible to supply to the line-peak-holding circuit 384 only a horizontal direction absolute of the high frequency components within the evaluation window. Further, if setting a window control signal WH so that the multiplied value can become smaller at a position near a window in the evaluation window, it is possible to eliminate any noise in the focus evaluation values based on an influence on an invasion of any extra-edges (any edges having high brightness) that exist near the window of the evaluation window into the evaluation window, which occurs responding to an advance of focusing, and an abrupt alteration in the focus evaluation values accompanied with any rolling and/or pitching of a subject.

The line-peak-holding circuit 384 may hold a peak value for every line. The vertical-direction-integrating circuit 386 vertically adds or integrates peak values, which have been held, of each line within the evaluation window based on a vertical direction window control signal WV to generate any focus evaluation values ID. It is to be noted that this scheme is so called as "HPeak" because a horizontal direction peak is once held.

Figure 5:
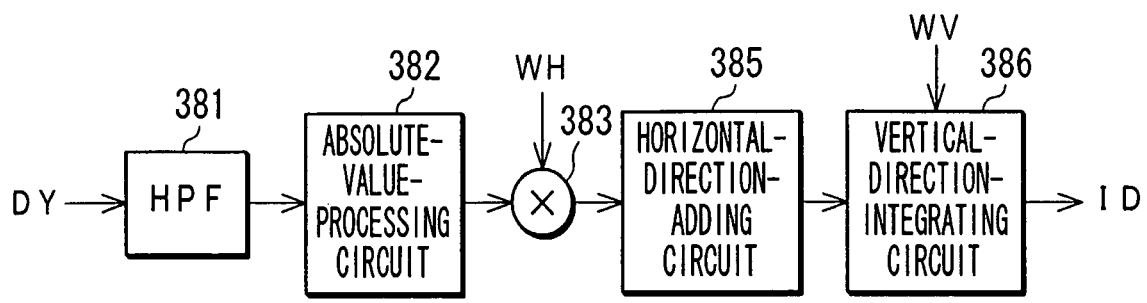
FIG. 5 is a block diagram for showing a configuration of a calculation filter of a horizontal and vertical direction integral scheme for filtering a horizontal direction focus evaluation value.

The HIntg scheme is a calculation method of focus evaluation values for obtaining horizontal direction focus evaluation values by using a vertical and horizontal integration. FIG. 5 shows a configuration of a calculation filter for filtering a horizontal direction focus evaluation value according to the vertical and horizontal integration, which may be used in the focus-evaluation-value-calculating unit 37. This calculation filter has a configuration similar to the above calculation filter of HPeak scheme as shown in FIG. 4 except for using a horizontal-direction-adding circuit 385 in stead of the line-peak-holding circuit. In this calculation filter shown in FIG. 5, the horizontal-direction-adding circuit 385 horizontally adds all the absolute values of the high frequency components within the evaluation window and the vertical-direction-integrating circuit 386 vertically integrates the added result of all the lines in the evaluation window.

Such the calculation filter for filtering a horizontal direction focus evaluation value according to the vertical and horizontal integration is used for calculating the focus evaluation values ID6, ID7, ID12, and ID13, in this embodiment.

As comparing the HIntg scheme with the HPeak scheme, they are different from each other in that in the HPeak scheme, a peak value is calculated for every line and the calculated peak values are vertically added while in the HIntg, all the absolute values of the high frequency components in each line within the evaluation window are horizontally added and the added ones are vertically integrated.

The HIntg scheme is classified into "IIR1" that a high frequency component is used in its use data and "Y" that uses therein the brightness signal DY itself as it is. It is to be noted that a brightness-adding-value-calculating filter circuit, which is a filter circuit that removes HPF 381 from the calculation filter shown in FIG. 5, can get a brightness-adding value.

The VIntg scheme is a calculation method of focus evaluation values for obtaining vertical direction focus evaluation values by using a vertical integration. In this embodiment, it is used for calculating the focus evaluation values ID4, and ID5. Both of the HPeak and HIntg schemes perform a horizontal addition to produce the focus evaluation values while the VIntg scheme adds high frequency components vertically to produce the focus evaluation values. If only the vertical high frequency components exist but no horizontal high frequency component exist, for example, an image in which an upper half of scene is white and a lower half of the scene is black, i.e., an image of the horizon or the like, the calculation method of horizontal direction focus evaluation values according to the HPeak scheme does not effectively function. The focus evaluation values of the VIntg scheme are used for the autofocus to function effectively in such the scenes.

Figure 6:
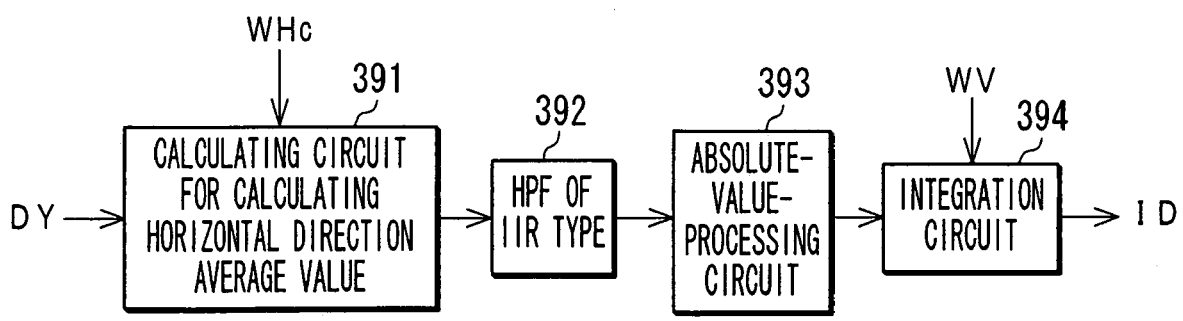
FIG. 6 is a block diagram for showing a configuration of a calculation filter for filtering a vertical direction focus evaluation value.

FIG. 6 shows a configuration of a calculation filter for filtering a vertical direction focus evaluation value, which may be used in the focus-evaluation-value-calculating unit 37. The calculation filter for filtering a vertical direction focus evaluation value has a calculating circuit 391 for calculating a horizontal direction average value, an HPF 392 of IIR type, an absolute-value-processing circuit 393, and an integration circuit 394.

The calculating circuit 391 selects from the brightness signal DY of each line a brightness signal of any pixels (for example, 63 pixels) positioned at a center portion of the evaluation window in a horizontal direction thereof based on a window control signal WHc and calculates an average value thereof to transmit it as one output per one horizontal period. It is because any noise existed at a periphery of the evaluation window is eliminated to select 64 pixels of the center portion thereof. In this embodiment, since data of 64 pixels is stored in sequence and one average value is finally output, a simple configuration without any necessary for storage device such as a line memory or a frame memory can be achieved. Next, HPF 392 of IIR type filters a high frequency component with it being synchronized with a line frequency. The absolute-value-processing circuit 393 then computes an absolute of the high frequency components. The integration circuit 394 vertically integrates all the lines within the evaluation window based on the vertical direction window control signal WV.

The Satul scheme is a calculation method for obtaining a number of saturated pixel in the brightness signal DY (particularly, a number of the pixel of which brightness level becomes over a predetermined level) in the evaluation window. In this embodiment, the Satul scheme is used for calculating the focus evaluation value ID8. In the calculation of the focus evaluation value ID8, the focus evaluation value ID8 is determined by calculating how many pixels exceeding a threshold value α stay in the evaluation window for each field with the brightness signal DY being compared to the threshold value α.

Referring back to FIG. 1, a reference-signal-producing unit 40 produces a vertical synchronizing signal VD, a horizontal synchronizing signal HD, and a reference clock signal CLK, based on which each unit in the video camera 10 operates. The reference-signal-producing unit 40 supplies these signals to an image-pickup-device-driving unit 42. The image-pickup-device-driving unit 42 generates a driving signal RIR based on the vertical synchronizing signal VD, the horizontal synchronizing signal HD, and the reference clock signal CLK thus supplied to supply it to the image pickup device 32R in order to drive it. Similarly, the image-pickup-device-driving unit 42 also generates driving signals RIG, RIB, respectively, to supply them to the image pickup devices 32G, 32B in order to drive them. It is to be noted that the preamplifiers 33R, 33G, and 33B, the A/D converters 34R, 34G, and 34B, the preprocessing unit 35, the signal-processing unit 36, the focus-evaluation-value-calculating unit 37 and the like performs various kinds of processing using the vertical synchronizing signal VD, the horizontal synchronizing signal HD, and the reference clock signal CLK that are synchronized with an image signal received from their respective previous units. These signals may be received from the reference-signal-producing unit 40 or from their respective previous units together with the image signal.

Responding a request from the camera-block-controlling unit 52, a distance measurement sensor 45 performs any measurement to supply to the camera-block-controlling unit 52 a measured distance result Mag indicating a distance to a subject. When failing to perform any measurement, the distance measurement sensor 45 transmits data (hereinafter referred to as "inability data NG") indicating inability to perform any measurement as the measured distance result Mag. The distance measurement sensor 45 illustrates a distance measurement sensor of active scheme that measures a distance to a subject by utilizing a reflection of infrared ray, electric wave, or the like when irradiating it. The distance measurement sensor 45 also illustrates a distance measurement sensor of a passive scheme that measures a distance to a subject by utilizing a shift, sharpness or the like of brightness signal obtained by detecting brightness information on the subject using a sensor.

A display-driving unit 47 is connected to a display device 48. The display-driving unit 47 generates display-driving signal RDM based on an image signal DVvf received from the signal-processing unit 36 or a display signal DVmm received from the camera-block-controlling unit 52 and supplies it to the display device 48.

The display device is constituted of image display element such as liquid crystal display element and cathode ray tube. Based on the display-driving signal RDM, the image display element is driven to display an imaged image, various kinds of information, and a menu for performing various kinds of setting in the imaging apparatus on a screen of the display device 48.

The camera-block-controlling unit 52 is connected to the user interface 56. The camera-block-controlling unit 52 generates any control signals based on the manipulation signal PSC received from the user interface 56 and supplies the control signals to respective units to control them so that the video camera 10 can operate based on the manipulation signal PSC or the like.

The lens-block-controlling unit 51 and the camera-block-controlling unit 52 can be communicated to each other using a previously set format and/or a previously set protocol. The lens-block-controlling unit 51 and the camera-block-controlling unit 52 perform any control on autofocus operations.

The lens-block-controlling unit 51 also supplies to the camera-block-controlling unit 52 various kinds of information QF (for example, information on a position of a focal point of the lens, an iris value and the like) responding a request from the camera-block-controlling unit 52.

The lens-block-controlling unit 51 further generates lens-driving signals RDf, RDw based on the focus control signal CTf, the wobbling control signal CTw and the like that are received from the camera-block-controlling unit 52 and controls the lens-driving units 21b, 22b to drive the focus lens 21 and wobbling lens 22.

The camera-block-controlling unit 52 generates the focus control signal CTf for performing a drive control of the focus lens 21 and the wobbling control signal CTw for performing a drive control of the wobbling lens 22, based on the focus evaluation values ID calculated in the focus-evaluation-value-calculating unit 37, the measured distance result Mag obtained by the distance measurement sensor 45, and various kinds of information read out of the lens-block-controlling unit 51. The camera-block-controlling unit 52 supplies them to the lens-block-controlling unit 51.

The camera-block-controlling unit 52 changes the contents of setting on the autofocus operations and generates display signal DVmm for displaying a menu for changing the contents of setting to allow the autofocus operations to be performed according to any request from a user. The camera-block-controlling unit 52 supplies the display signal DVmm to the display-driving unit 47. A contents-of-setting storage unit 58 for storing contents of setting on the autofocus operations is connected to the camera-block-controlling unit 52. The contents-of-setting storage unit 58 can store a new content of setting. Any contents of setting can be selectively read out of the contents-of-setting storage unit 58. This enables the autofocus operations to be switched or to be performed according to any use of the video camera 10.

The lens-block-controlling unit 51 and the camera-block-controlling unit 52 can be built-in together. In the following description, a controller 50 will indicate a combination of the lens-block-controlling unit 51 and the camera-block-controlling unit 52. The controller 50 may be constituted of microcomputer, a memory and the like and execute autofocus operations by running various programs read out of the memory.

Figure 7:
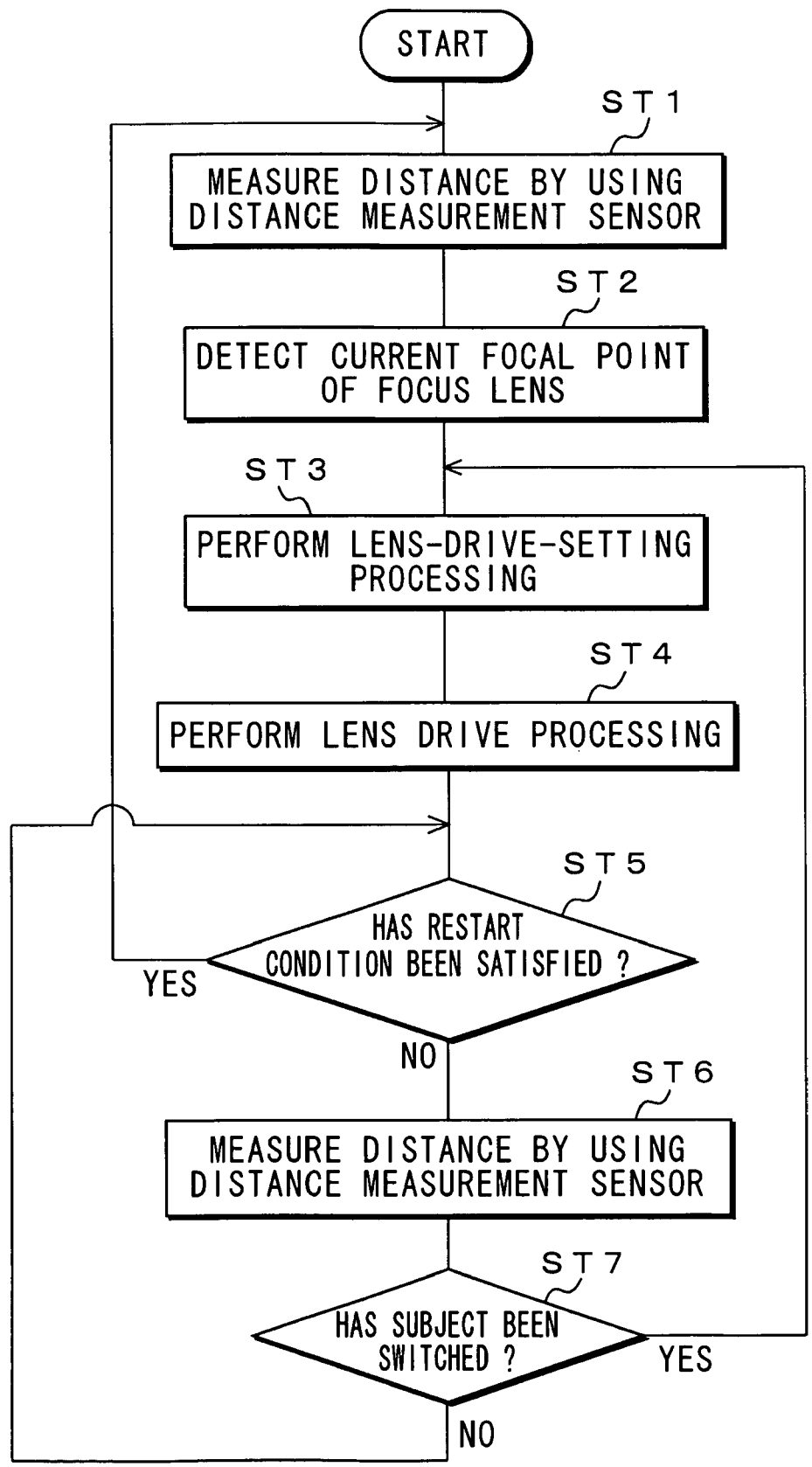
FIG. 7 is a flowchart for showing autofocus operations of the video camera.

The following will describe autofocus operations of the video camera 10. FIG. 7 shows a flowchart of an autofocus operation.

At a step ST1, the controller 50 controls the distance measurement sensor 45 to measure the distance to a subject and to transmit the measured distance result Mag therefrom.

At a step ST2, the controller 50 detects a current position of a focal point FPs of the focus lens 21 based on the detection signal RSf received from the lens-position-detecting unit 21a.

At a step ST3, the controller 50 performs any lens-drive-setting processing. In such the lens-drive-setting processing, a driving direction and a driving speed of the focus lens 21 is set based on the current position of a focal point FPs and the measured distance result Mag.

Figure 8:
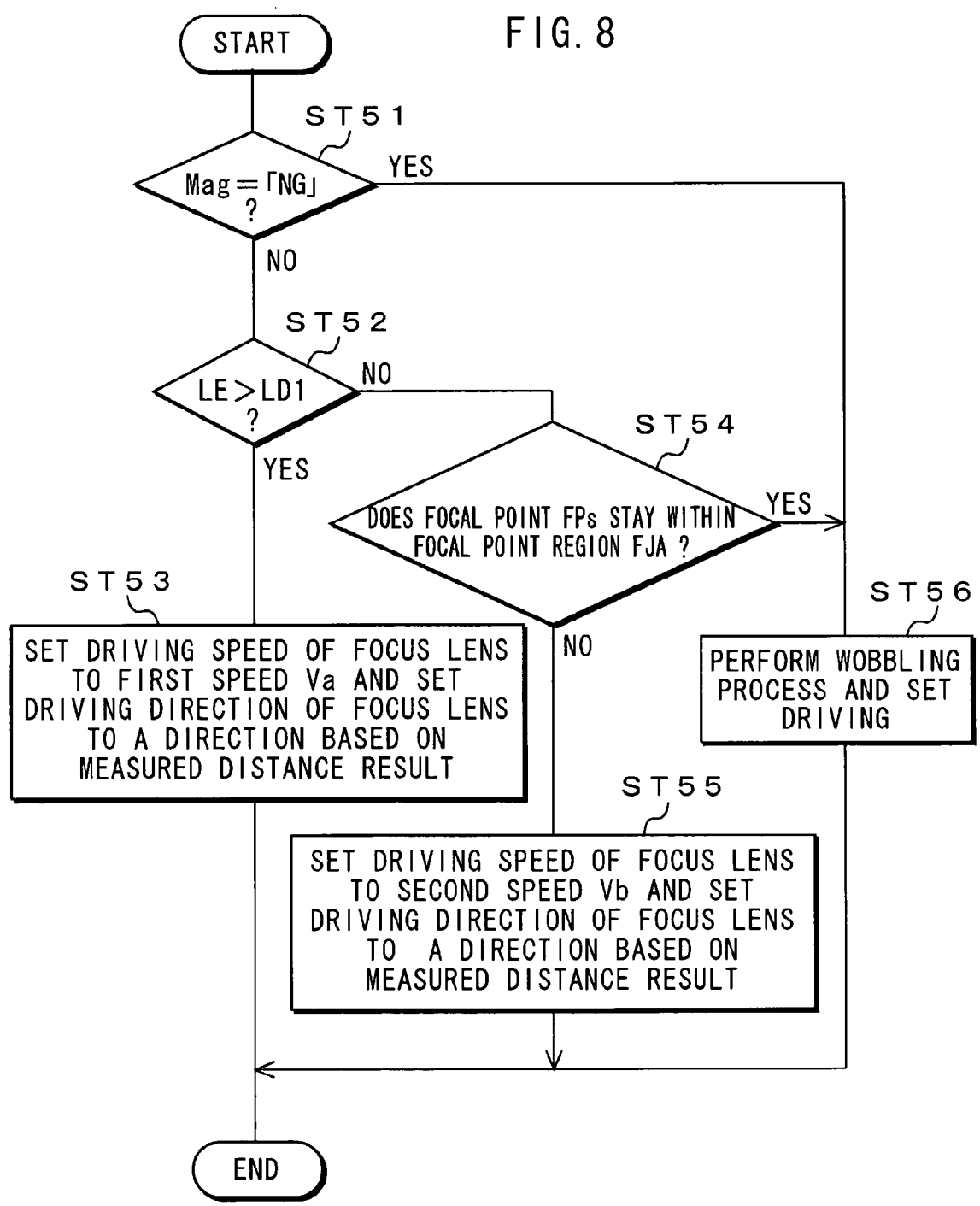
FIG. 8 is a flowchart for showing lens-drive-setting processing.

FIG. 8 shows a flowchart of the lens-drive-setting processing.

At a step ST51, the controller 50 determines whether the measured distance result Mag is inability data NG. If no inability data NG, the processing goes to a step ST52 while if inability data NG, the processing goes to a step ST 56.

At the step ST52, the controller 50 determines whether the current position of the focal point FPs stays away from the in-focus region FJA based on the measured distance result Mag with it staying further away from a first determined distance LD1. If a distance LE from the current position of the focal point FPs to the in-focus region FJA based on the measured distance result Mag is longer than the first determined distance LD1, the processing goes to a step ST53 while if not, the processing goes to a step ST54.

The in-focus region FJA is set relative to the measured distance result Mag so that a in-focus position FPj on a subject, which corresponds to the measured distance result Mag, can be included therein. For example, an erroneous region of distance measurement based on the measured distance result Mag is set to the in-focus region FJA. Alternatively, a region that is wider than the erroneous region of distance measurement based on the measured distance result Mag may be set to the in-focus region FJA. An amount of the first determined distance LD1 can be set taking into consideration a control facility of the focus lens 21. Namely, if the focus lens 21 is tried to be driven at a first driving speed Va, which will be described later, when the first determined distance LD1 is too short, the focus lens would have already reached the in-focus position FPj before it reaches to the first driving speed Va. If the focus lens 21 is driven at a very high speed, it may take much time to stop the focus lens 21, so that if the focus lens 21 is tried to stop when the focus lens 21 reaches near the in-focus position FPj, the focus lens 21 may pass through the in-focus position FPj, thereby resulting in poor focus operation. Therefore, the first determined distance LD1 can be set based on a maximum speed and control facility when the focus lens 21 is driven. Since such the maximum speed and control facility are different based on focus length and an iris value, the first determined distance LD1 can be adjusted based on the focus length and the iris value.

At the step ST53, the controller 50 sets a driving speed of the focus lens 21 to the first driving speed Va to let the focal point FPs of the focus lens 21 rapidly arrive the in-focus position FPj because the current position of the focal point FPs of the focus lens 21 stays away from the in-focus region FJA with the position of the focal point staying further away from the first determined distance LD1. The controller 50 also sets a driving direction of the focus lens 21 to a direction based on the measured distance result Mag. In other wards, the driving direction is set so that the focal point FPs of the focus lens 21 can be driven toward a direction of a position of a focal point FPm indicated by the measured distance result Mag. Since it is possible to correctly determine a driving direction of the focus lens 21 based on the measured distance result Mag by the distance measurement sensor 45, any wobbling is not necessary for determining its driving direction thereof.

The first driving speed Va of the focus lens 21 is used for allowing the focal point of the focus lens 21 to be rapidly approached to the in-focus position. It is not necessary to limit its driving speed to prevent the focal point thereof from passing through the peak in the curve of the focus evaluation values because every focus evaluation value is revised only one time per one field. Thus, the first driving speed Va may be maximum one of allowable driving speeds when the focus lens 21 is driven.

The processing then goes from step ST52 to the step ST54 where the controller 50 determines whether a current position of the focal point FPs of the focus lens 21 stays within the in-focus region FJA. If no position of the focal point FPs stays within the in-focus region FJA, the processing goes to a step ST55 while if the position of the focal point FPs stays within the in-focus region FJA, the processing goes to a step ST56.

At the step ST55, the controller 50 sets a driving speed of the focus lens 21 to a second driving speed Vb that is slower than the first driving speed Va. The controller 50 also sets a driving direction thereof to a direction based on the measured distance result Mag. In other words, the driving direction thereof is set so that the focal point FPs of the focus lens 21 can be driven toward a direction of a position of a focal point FPm indicated by the measured distance result Mag. This second driving speed Vb is set to allow a speed change from the second driving speed Vb to a third driving speed Vc that is slower than the second driving speed Vb to be smoothly achieved in order to prevent a curve of the focus evaluation values indicating an alteration in the focus evaluation values when the focus lens 21 is driven from being dwarfed.

For example, it is estimated that a depth-of-field is Fs, the second driving speed Vb is set to 12 Fs/field. It is to be noted that the third driving speed Vc is set to a speed that is capable of detecting a peak of the curve of the focus evaluation values accurately, for example, 2 Fs/field. If the maximum one of allowable speeds when the focus lens 21 is driven is not more than 12 Fs/field, the first driving speed Va is equal to the second driving speed Vb.

When the processing goes to the step ST56 from the step ST51 or ST54, the controller 50 performs wobbling similar to the past cases, and sets a driving direction of the focus lens 21 based on an alteration in the focus evaluation values when the wobbling lens 22 is driven. In this case, the controller 50 sets a driving speed of the focus lens 21 to the second driving speed Vb thereof. If a distance between the current position of the focal point FPs and a position of the focal point FPm is short, the controller 50 can set a driving speed of the focus lens 21 to the third driving speed Vc thereof because the current position of the focal point FPs stays near the in-focus position FPj.

Thereafter, at the step ST4 shown in FIG. 7, the controller 50 performs the lens drive processing. In the lens drive processing, a switch of driving speeds of the focus lens 21 and hill-climbing control processing similar to the past cases are performed, so that the focus lens 21 is driven to meet a position of the focal point FPs thereof to the in-focus position FPj.

If a distance from a position of the focal point FPs to the in-focus region FJA is shorter than a second determined distance LD2 that is shorter than the first determined distance LD1, the driving speeds of the focus lens 21 is switched from the first driving speed Va to the second driving speed Vb. The second determined distance LD2 is set so that the driving speed of the focus lens 21 can be decreased to the second driving speed Vb within the in-focus region FJA when the driving speed of the focus lens 21 is switched from the first driving speed Va to the second driving speed Vb, which will be described later, at a position, for example, away from the in-focus region FJA by the second determined distance LD2. Such the setting may prevent a focal point of the focus lens 21 from passing through a peak of the curve of the focus evaluation values in the in-focus region FJA because of less numbers of the focus evaluation values.

In the hill-climbing control processing, any increase and decrease in the focus evaluation values calculated by the focus-evaluation-value-calculating unit 37 are detected and the focal point FPs of the focus lens 21 is driven so that this detected focus evaluation value can be maximum value, thereby meeting a position of the focal point FPs to the in-focus position FPj. In the hill-climbing control processing using the focus evaluation values in this embodiment, the focus lens 21 is driven so that the above focus evaluation value ID0, ID2 or the like can be maximum value. If pixels having larger brightness increase, an evaluation window size W1 is switched to an evaluation window size W5 and the focus evaluation value is calculated by using the focus evaluation value ID8, in order to prevent the focus lens 21 from being driven to a direction where blur occurs. Further, by using the focus evaluation value ID0 and other focus evaluation values ID1 through ID7 and ID9 through ID13, a change of driving speeds of the focus lens 21 can be determined, any rolling and/or pitching of the subject can be determined, a reverse driving of the focus lens 21 can be determined, and a reach of focus lens 21 to its Near point or Far point can be determined. Based on these determination results, driving operations of the focus lens 21 is controlled to achieve an excellent accurate focusing. Thus, such the hill-climbing control processing is performed to meet the position of the focal point of the focus lens 21 to the in-focus position FPj. The autofocus operations then finish.

Figure 9:
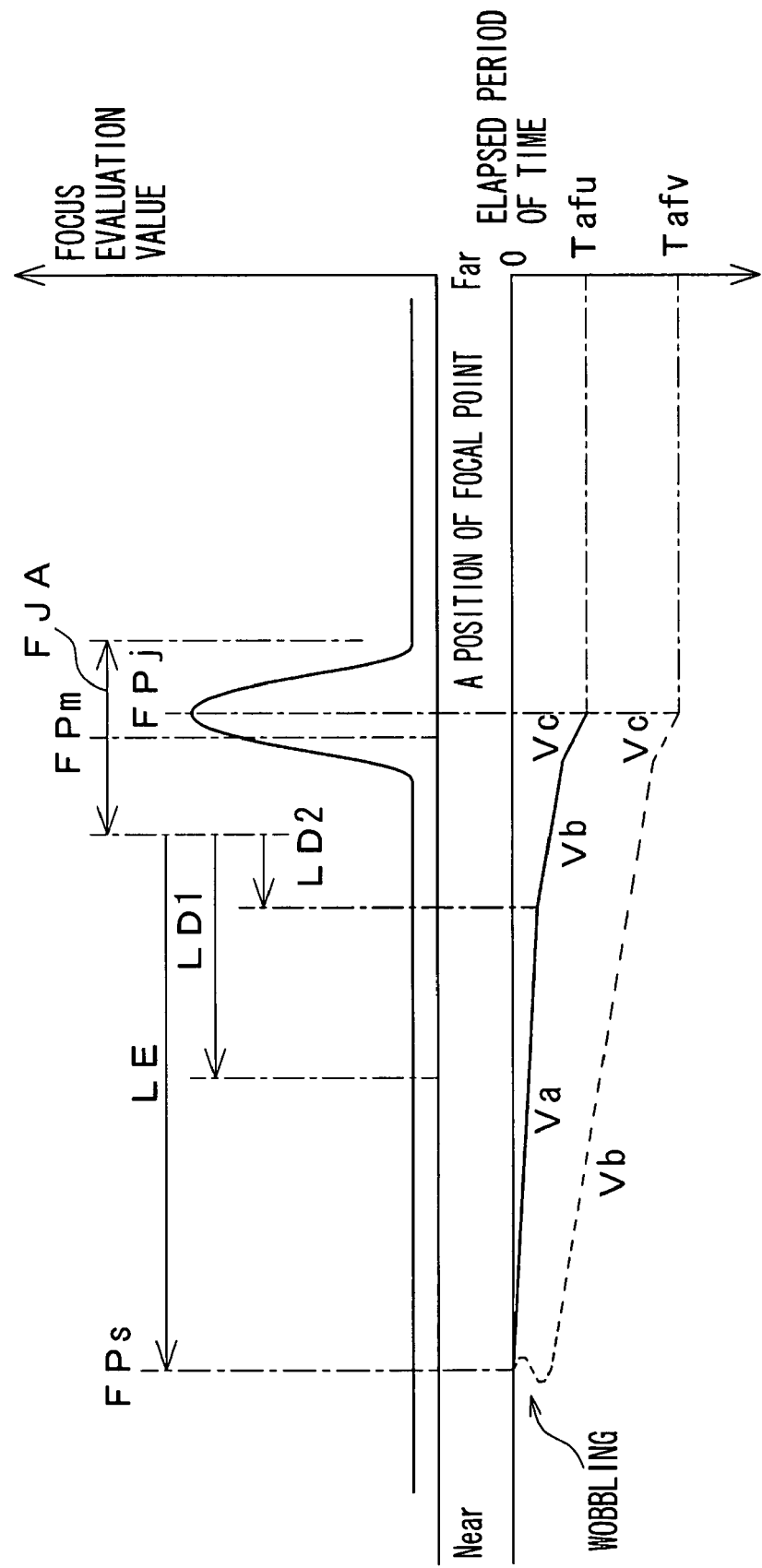
FIG. 9 is a diagram for explaining autofocus operations using a measured distance result.

FIG. 9 shows the autofocus operations using the measured distance result. When a current position of the focal point FPs of the focus lens 21 stays away from the in-focus region FJA based on the measured distance result Mag with the position of the focal point staying further away from the first determined distance LD1, namely, the distance LE from the current position of the focal point FPs to the in-focus region FJA based on the measured distance result Mag is longer than the first determined distance LD1, the focus lens 21 is driven at the first driving speed Va without any wobbling. The focus lens 21 is then driven at the second driving speed Vb and the third driving speed Vc. When a period of time Tafu is elapsed, the position of focal point FPs meets the in-focus position FPj. This allows a period of focusing time to be much shortened as compared with the past autofocus operations, shown in FIG. 10 by broken lines, such that wobbling is performed to determine a direction where the focus lens is driven, the focus lens 21 is then driven at the second driving speed Vb, and when a period of time Tafv is elapsed, the position of focal point FPS meets the in-focus position FPj.

When a current position of the focal point FPa stays nearer the in-focus region FJA based on the measured distance result Mag than the first determined distance LD1 with the position of the focal point staying out of the in-focus region FJA, the focus lens 21 is driven at the second driving speed Vb without any wobbling. This allows a period of focusing time to be shortened as compared with the past autofocus operation such that the wobbling is performed at a start point of the autofocus operation.

Thereafter, at the step ST5 shown in FIG. 7, the controller 50 determines whether any restart condition to restart the autofocus operation has been satisfied. If the restart condition has been satisfied, the processing goes back to the step ST1 where the above processing will be repeated so that the focus lens 21 is driven to meet a position of the focal point of the lens 21 to an in-focus position thereof. If the restart condition has not yet been satisfied, the processing goes to step ST6.

The following will describe the restart condition. In this embodiment, there are two modes, a scene steady mode and a scene unsteady mode. If an alteration in brightness exceeds a predetermined threshold value, it is determined that the video camera 10 pans in a horizontal plane thereof or a subject moves on a large scale to switch the mode to the scene unsteady mode. If an alteration in brightness becomes smaller to satisfy any switching condition for switching the mode from the scene unsteady mode to the scene steady mode, the scene unsteady mode is switched to the scene steady mode. In this scene steady mode where an alteration in brightness is small, it is determined that the video camera 10 does not pan or pans slowly, if any, or a subject does not move. In this embodiment, it is set so that the restart is stopped in the scene unsteady mode and the restart can be performed when the scene unsteady mode is switched to the scene steady mode.

Thus, the restart using such the alteration in brightness avoids any erroneous determination on the restart because a field of view is not changed if a position of the focal point of the lens comes closer to the in-focus position thereof during the autofocus operations to make little brightness integration value thereof changed.

Herein, as the brightness integration value, a normalized difference p0 of the brightness integration is illustratively used. The normalized difference p0 can be calculated according to the following equation:

$$p0=(Yadd\_W5\_f0-Yadd\_W5\_f1)/Ynow\_W5\_f0/N1 \qquad (1)$$

where a term, "Yadd_W5_f0" indicates a sum total of brightness integration values of an image signal relative to an evaluation window W5 within a period of time from a previous field of N1 to a current field; a term, "Yadd_W5_f1" indicates a sum total of brightness integration values of an image signal relative to an evaluation window W5 within a period of time from a field of N1+1 to a previous field of 2*N1; and a term, "Ynow_W5_f0" indicates a brightness integration value of an image signal relative to an evaluation window W5 in a current field.

When an absolute value ABS (p0) of the normalized difference p0 exceeds a predetermined threshold value β1 in the scene steady mode, the mode is switched from the scene steady mode to the scene unsteady mode. When the absolute value ABS (p0) falls below a predetermined threshold value β2 in the scene unsteady mode, the mode is switched from the scene unsteady mode to the scene steady mode to restart the autofocus operation and meet a position of the focal point of the lens to an in-focus position thereof to complete the autofocus operation.

Alternatively, as the restart condition, an alteration in focus evaluation values can be used. In this embodiment, if a average value of the focus evaluation values ID0 in a time direction thereof increases from the focus evaluation value of the autofocus operation completion (just after meeting a position of the focal point of the focus lens to the in-focus position thereof) by a set rate thereof during the scene steady mode, the restart can be performed.

If the video camera 10 is set firmly and a scene change is small, for example, a scene where a subject comes toward the video camera 10 thus set, little brightness integration value is changed so that the restart fails to be performed if only normalized difference of the brightness integration is taken into consideration. If, however, an average of the focus evaluation values in a time direction thereof is taken into consideration, it is also possible to restart the autofocus operation in this situation.

An alteration q0 in the focus evaluation values can be calculated according to the following equation:

$$q0 = Hadd\_W1\_f1 / Hadd\_W1\_f0 \quad (2)$$

where a term, "Hadd_W1_f0" indicates a sum total of the focus evaluation values calculated, for example, added by using frequency components of the image signal relative to an evaluation window W1 within a period of time from a time when a scene is stable to a field of M; and a term, "Hadd_W1_f1" indicates a sum total of the focus evaluation values within a period of time from a current field to a previous filed of M.

In this embodiment, if the alteration q0 in the focus evaluation values falls below $1/\gamma$ or exceeds $\gamma$, the autofocus operation restarts ($\gamma$ and M are respectively constants).

Thus, using an alteration in the average of the focus evaluation values in a time direction thereof enables the restart without any influence on any rolling and/or pitching of subject and/or any vibrations of the camera.

When using any normalized difference, it is not easy to restart the autofocus operation because little alteration in the normalized difference shows if the camera pans very slowly. Thus, in this embodiment, if the brightness integration value increases from the focus evaluation value of the autofocus operation completion (just after meeting a position of the focal point of the focus lens to the in-focus position thereof) by a set rate thereof, the restart can be performed.

An alteration r0 in the brightness integration values can be calculated according to the following equation:

$$r0 = Y\_now / Y\_jp \quad (3)$$

where a term, "Y_now" indicates a current brightness integration value; and a term, "Y_jp" indicates a brightness integration value just after the autofocus operation is completed.

In this embodiment, if the alteration r0 in the brightness integration values falls below $1/\delta$ or exceeds $\delta$, the autofocus operation restarts ($\delta$ is constants). Thus, using the alteration in the brightness integration values enables the autofocus operation restarting even if the camera pans very slowly.

Thereafter, the processing goes from the step ST5 shown in FIG. 7 to step ST6 where the control unit 50 controls the distance measurement sensor 45 to measure a distance to a subject and to transmit a measured distance result Mag therefrom, similar to the step ST1.

At step ST7, the control unit 50 determines whether the subject to be in focus has been switched. If the subject to be in focus has been switched, the processing goes back to the step ST3 where the lens-drive-setting processing and the lens-drive processing are performed, thereby allowing an autofocus process operation again so that the switched subject can be in focus. If the subject to be in focus has not yet been switched, the processing goes back to the step ST5.

The subjects to be in focus are switched by determining whether a subject existing in a position having a distance different from a position of the focal point FPs of the lens where the subject is in focus when the lens-drive processing is completed at the step ST4 can be imaged. For example, it is determined that the subject to be in focus has been switched if a determination period of time when a difference between a current position of the focal point FPs of the lens and the position of the focal point FPm of the lens based on the measured distance result Mag exceeds a predetermined threshold value lasts longer than a reference period of time for the switch of focusing on subjects. It is also determined that the subject to be in focus has not yet been switched if a difference between a current position of the focal point FPs of the lens and the position of the focal point FPm of the lens based on the measured distance result Mag falls below a predetermined threshold value or if a determination period of time when the difference exceeds a predetermined threshold value lasts shorter than the reference period of time for the switch of focusing on subjects. The reference period of time for the switch of focusing on subjects is set so that the autofocus operation does not restart if another subject than the desired subject includes within a field of view for distance measurement by the distance measurement sensor 45 briefly. For example, if the reference period of time is set to 2 or 3 seconds, even when any person passes before the video camera 10, it is possible to prevent the autofocus operation where the passing person is in focus from restarting.

Figure 10A:
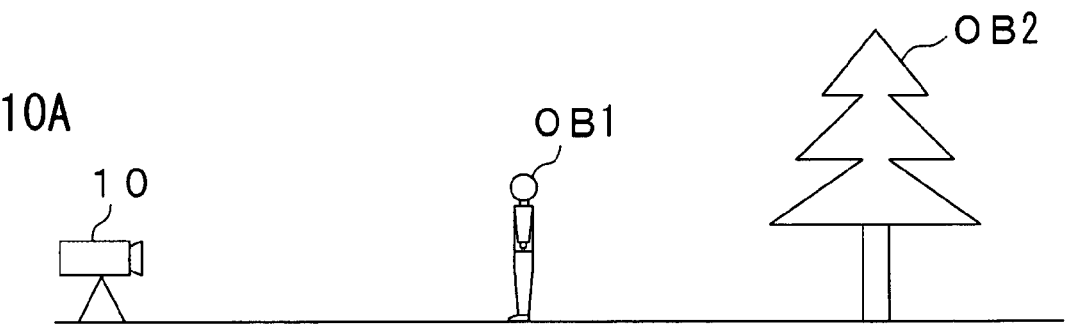
FIGS. 10A through 10C are drawings for illustrating back-focus-solving operations.
Figure 10B:
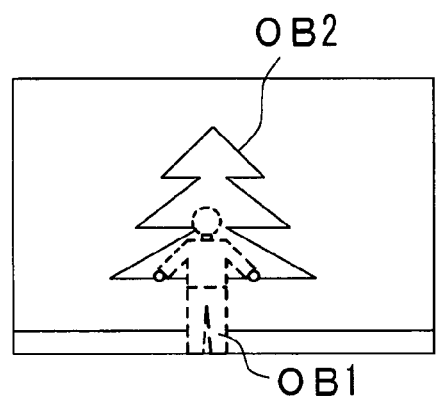
Figure 10C:
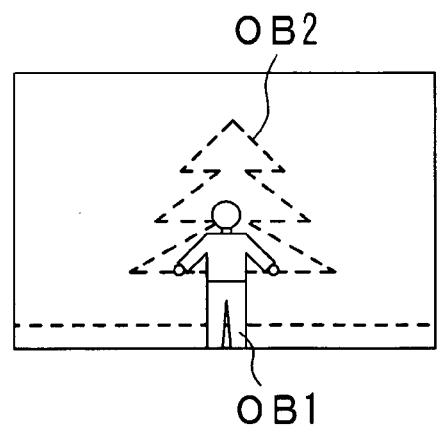

Thus, when it has been determined that the subject to be in focus has been switched by setting the reference period of time for the switch of focusing on subjects and the threshold value, any issue of back focus (main subject focused on is out of focus but the background is in focus) can be solved if the autofocus operation is again performed by using a measured distance result Mag. For example, as shown in FIG. 10A, if an imaging apparatus 10 images a subject person OB1 and a background tree OB2 simultaneously, a blur image of the subject person OB1 occurs, as shown in FIG. 10B, when the tree OB2 is in focus. In this situation, a field of view for distance measurement by the distance measurement sensor 45 is set to the subject person OB1 that exists before the background tree OB2. In this time, if a determination period of time when a difference between the current position of the focal point FPs of the lens and the position of the focal point FPm of the lens based on the measured distance result Mag exceeds a predetermined distance for determination of the switching lasts longer than a reference period of time for the switch of focusing on subjects, the current position of the focal point FPs of the lens is shifted into an in-focus region FJA based on the measured distance result Mag, thereby enabling the hill-climbing processing to be carried out. This allows a blur image of the background tree OB2 to occur, as shown in FIG. 10C, when the subject person OB1 is in focus. Thus, in this embodiment, the issue of the back focus can be solved.

When the above autofocus operations have been performed according to any previously set contents of setting, the video camera 10 may fail to carry out the autofocus operations according to any uses of the video camera 10. For example, if the autofocus operation of the video camera 10 has been set so as to be suitable to a weather camera, it may take much time to focus on a subject when using the video camera 10 in a sports program or a news program, so that a chance of releasing a shutter in right moment can be missed. It is desirable to change contents of setting that have been set relative to the autofocus operations in order to carry out the autofocus operations according to any uses of the video camera 10. If such the contents of setting are stored and a desired content of the setting can be read and used among the stored contents of setting, it is possible to carry out the autofocus operations according to any uses of the video camera 10 with ease.

FIG. 11 is a flowchart for showing setting-contents-changing processing that can change the contents of setting, which have been already set, based on the user's manipulations.

At step ST71, the control unit 50 determines whether a stored content of setting is specified. If a stored content of setting is specified, for example, setting identification information that is used for identifying the content of setting has been stored with it correlating to any contents of setting and the stored setting identification information is specified, the processing goes to step ST 72. On the other hand, if no stored content of setting is specified, the processing goes to step ST73.

At step ST72, the control unit 50 reads the specified content of setting and the processing goes to step ST74. At the step ST73, the control unit 50 reads a current content of setting and the processing goes to the step ST74.

At the step ST74, the control unit 50 displays a menu for changing the contents of setting on a screen of a display device 48. On the menu for changing the contents of setting, contents of setting thus read out are displayed for every item of setting.

Figure 12:
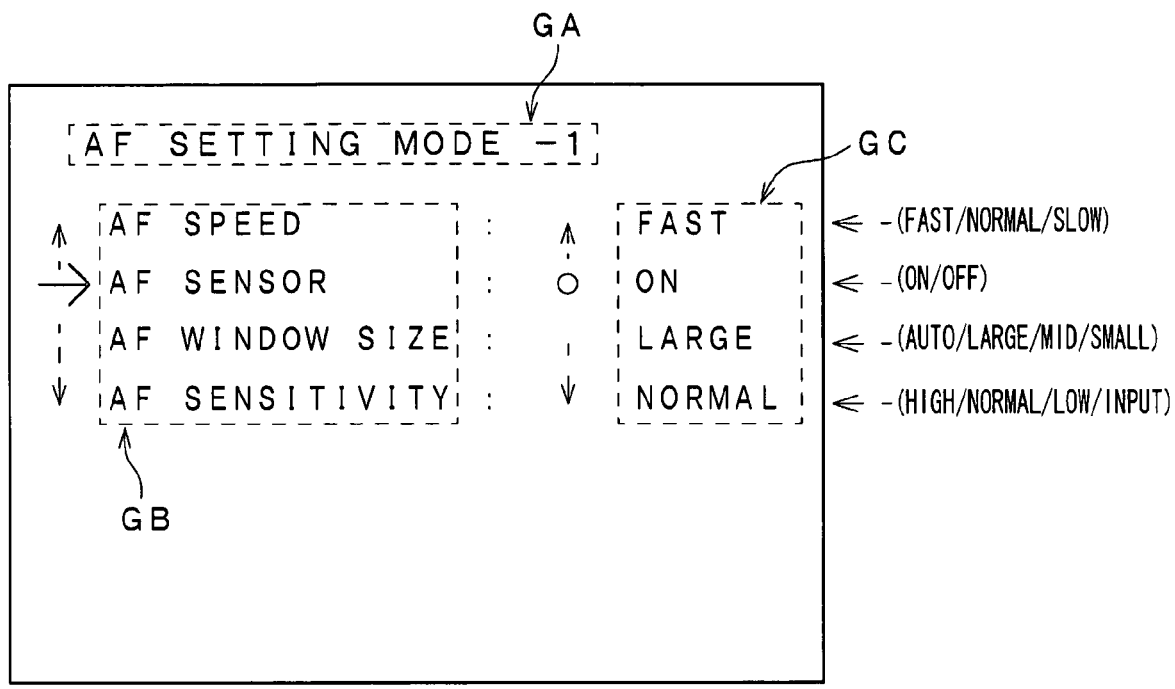
FIG. 12 is a drawing for illustrating a menu for changing the contents of setting.

FIG. 12 illustrates a menu for changing the contents of setting. In the menu for changing the contents of setting, there are three display regions, namely, a display region GA for displaying the setting identification information that is used for identifying the content of setting, a display region GB for displaying the item of setting, and a display region GC for displaying a setting state of each item of setting.

On the display region GA, as the setting identification information, for example, a setting title, a setting number, a user identification number are displayed.

On the display region GB, as the items of setting, for example, an item, "AF SPEED" relative to setting of focus operation speed, an item, "AF SENSER" relative to setting of any use of the distance measurement sensor 45, an item, "AF WINDOW SIZE" relative to setting of a size of the distance measurement window by the distance measurement sensor 45, an item, "AF SENSITIVITY" relative to setting of the restart of the auto focus operations, and the like are displayed.

On the display region GC, the setting state on each of the items of setting displayed on the display region GB is displayed for every item of setting. In order to determine how any change of setting is available when performing any change of the setting, selectable contents of setting can be also displayed on the display region GC.

At step ST75, the control unit 50 changes contents of setting according to user's manipulations. When the user interface 55 or 56 is manipulated to shift a cursor marked by an arrow upwardly or downwardly, as shown in FIG. 12, the control unit 50 shifts a cursor marked by an arrow upwardly or downwardly based on the manipulation thereof. A cursor marked by a black circle is also shifted accompanying with the shift of the cursor marked by the arrow. It is to be noted that the black circle indicates a display position of the setting state relative to the item of setting that is indicated by the cursor marked by the arrow. If the user interface 55 or 56 is equipped with a rotary encoder (rotary switch) and the control unit 50 shifts the cursor marked by the arrow upwardly or downwardly based on the rotary manipulation thereof, it is easily possible to shift the cursor marked by the arrow.

When the cursor marked by the arrow is shifted to a position of a desired item of setting and the desired item of setting indicated with the cursor marked by the arrow is then selected, the control unit 50 changes the cursor marked by a black circle for indicating indicates a display position of the setting state to a cursor marked by a question mark for indicating that it is possible to change the setting state, which is not shown, and allows any change of the setting state. For example, if the rotary encoder is equipped with a push switch to operate the push switch when the rotary encoder is pushed, the control unit 50 determines that the desired item of setting indicated with the cursor marked by the arrow is selected and allows any change of the setting state when the rotary encoder is pushed after the cursor marked by the arrow has been shifted.

If the rotary encoder performs a setting-switching operation in a state when any change of the setting state is allowed, the control unit 50 repeatedly displays selectable contents of setting in order on the display region GC so that it is possible to determine how content of setting can be selected. If the push switch is manipulated to select a desired content of setting in a situation where the desired content of setting is displayed, the content of setting relative to this item of setting is changed to a displayed content of setting.

The following will describe the items of setting and their contents of setting. Regarding item, "AF SPEED", any one of a fast speed, "FAST", a normal speed, "NORMAL", and a slow speed, "SLOW" can be selected as the content of setting. The fast speed, "FAST" is a setting state in which a period of focusing time puts priority on everything. For example, the above second speed Vb is set to 12 Fs/field. If the second speed is set to 12 Fs/field, the period of focusing time is made smaller, so that it is easily possible to focus on a subject having a large amount of movement.

The normal speed, "NORMAL" is a setting state in which getting a smooth movement of a subject in an image puts priority on everything. For example, the above second speed Vb is set to 6 Fs/field. If the second speed is set to 6 Fs/field, it is possible to get focus evaluation values more than those of the state of the fast speed, "FAST". This enables the focus evaluation value to pass less through the peak of the focus evaluation than those of the state of the fast speed, "FAST", thereby getting any smooth movement of a subject in an image. This setting state is available for any picture productions (including a motion-picture production) that images and records a process of focusing too.

The slow speed, "SLOW" is a setting state in which focus accuracy puts priority on everything. For example, the above second speed Vb is set to the third speed Vc. If the second speed is set to the third speed, this avoids passing through the peak of focus evaluation values, thereby getting accurate autofocus operation.

Regarding item, "AF SENSER", either validity, "ON" or invalidity, "OFF" can be selected as the content of setting. If "ON", the distance measurement sensor 45 performs any distance measurement and the above autofocus operation can be performed using the above measured distance result. If "OFF", the distance measurement sensor 45 stops performing any distance measurement or the measured distance result is set to "NG" and an autofocus operation is performed without using any measured distance result.

Regarding item, "AF WINDOW SIZE", any one of an automatic setting, "AUTO", a large size setting, "LARGE", a middle size setting, "MID", and a small size setting, "SMALL" can be selected as the content of setting. If "AUTO", a distance measurement can be performed using a standard field of view for distance measurement that has been previously set. If "LARGE", a larger field of view for distance measurement (for example, whole image) can be set. If "MID", a field of view for distance measurement is set to a half of the image. If "SMALL", a field of view for distance measurement is set to a quarter of the image.

A size of the distance measurement window and stability of the autofocus operation have a trade-off relationship. If "LARGE" is selected, the stability of the autofocus operation increases (so that less erroneous operations occur) while if so, another subject than a desired subject can be included in the distance measurement window so that probability where it can focus on another subject increases. If "SMALL" is selected, it is possible to focus on a desired subject accurately when imaging with the desired subject being included in the distance measurement window because the window is small.

Regarding item, "AF SENSITIVITY", any one of high sensitivity, "HIGH", normal sensitivity, "NORMAL", low sensitivity, "LOW, and threshold input, "INPUT" can be selected as the content of setting. If "HIGH", the above threshold value β2 is set to a value that is larger than that of "NORMAL" or the above threshold value γ or δ is set to a value that is smaller than that of "NORMAL". This allows the restart to be done with ease. If "LOW", the above threshold value β2 is set to a value that is smaller than that of "NORMAL" or the above threshold value γ or δ is set to a value that is larger than that of "NORMAL". This allows the restart to be done with unease. If "INPUT", the interface 55 or 56 can input any threshold values β1, β2 and γ or δ.

In this embodiment, a restart can be done not only according to an alteration in the absolute of normalized difference of the brightness integration, the focus evaluation values, and the brightness integration values relative to recorded focus evaluation values but also using an angular velocity detection result by an angular velocity sensor that is provided in the imaging apparatus. A threshold value can be set to this angular velocity detection result.

If "HIGH" is selected in the item of setting, "AF SENSITIVITY", it is easy to restart the autofocus. Thus, this setting is available for any imaging use that has a photo opportunity priority. If "LOW" is selected in this item of setting, it is not easy to restart the autofocus. This allows a life cycle of the focus lens to be extended and thus, this setting is available for a weather camera that is unnecessary for rapid autofocus operation. If "INPUT" is selected, a user can perform various kinds of setting carefully.

At step ST76, the control unit 50 determines whether an operation for finishing changing the contents of setting has been performed. If the operation for finishing changing the contents of setting has been performed, the processing goes to step ST77. If not, the processing goes back to the step ST75.

At the step ST77, the control unit 50 registers the contents of setting and stores the setting identification information with it being correlated to the contents of setting. For example, if updating the contents of setting that have been already registered, they can be updated by registering the updated contents of setting with them correlated to the setting identification information that has not yet been updated. When storing a new content of setting, new setting identification information is provided to the contents of setting that have been selected in the step ST75 and the content of setting is registered with the setting identification information being correlated to it.

Thus, if the user interface can set the contents of setting according to any use of video camera 10, it is possible to perform an autofocus operation according to any use thereof. In this embodiment, a contents-of-setting storage unit 58 can store the contents of setting. When the video camera 10 is used for any separate uses, it is possible to perform autofocus operations according to any use thereof if the contents of setting corresponding to this use are read out of the contents-of-setting storage unit 58 and used.

Although an imaging device has been described as a video camera in the above embodiments, this invention is not limited thereto. This invention is applicable to any other imaging device such as digital still camera.

It should be understood by those who skill in the art that various modifications, combinations, sub-combinations and alterations may occur depending on design requirements and other factors insofar as they are within the scope of the appended claims or the equivalents thereof.

What is claimed is:

1. An autofocus device comprising:
   a lens-driving unit that drives a lens;
   a focal-point-position-detecting unit that detects a position of a focal point of the lens;
   a focus-evaluation-value-calculating unit that calculates a focus evaluation value using a frequency component of an image signal in a particular region that is provided in an imaging frame,
      wherein the paiteular region is one of a plurality of image regions of different sizes, a center of each image region aligning a center of the imaging frame;
   a user interface that sets an autofocus content; and
   a control unit that performs a focus operation to control the lens-driving unit to drive the lens based on any of the focus evaluation value and the focus evaluation value and the position of a focal point of the lens, thereby meeting the position of the focal point of the lens detected by the focal-point-detecting unit to an in-focus position thereof,
   wherein the control unit controls the lens-driving unit and the focus-evaluation-value-calculating unit based on the autofocus content set by the user interface, thereby achieving a focus operation according to the set content.

2. The autofocus device according to claim 1, wherein, as the autofocus content is set, any one of a speed of driving the lens and a restart determination standard as restarting the focusing operation is set.

3. The autofocus device according to claim 1, wherein, as the autofocus content is set, a lens-drive processing is set.

4. The auto focus device according to claim 1, further comprising a storage unit that stores at least one autofocus content that is set by the user interface.

5. An autofocus method comprising:
   a focal-point-position detecting step of detecting a position of a focal point of a lens;
   a focus-evaluation-value-calculating step of calculating a focus evaluation value using a frequency component of an image signal in a particular region that is provided in an imaging frame,
      wherein the particular region is one of a plurality of image regions of different sizes, a center of each image region aligning a center of the imaging frame;
   a lens-driving step of performing a focus operation to drive the lens based on any of the focus evaluation value and the focus evaluation value and the position of a focal point of the lens, thereby meeting the position of the focal point of the lens detected by the focal-point-detecting step to an in-focus position thereof; and
   an operation-switching step of switching operations in the lens-driving step and the focus-evaluation-value-calculating step based on the autofocus content set by the user interface, thereby achieving a focus operation according to the set content.

6. A computer readable medium storing a computer program that when executed on a computer causes an autofocus processing, said program comprising:

a focal-point-position detecting step of detecting a position of a focal point of a lens;

a focus-evaluation-value-calculating step of calculating a focus evaluation value using a frequency component of an image signal in a particular region that is provided in an imaging frame,
wherein the particular region is one of a plurality of image regions of different sizes, a center of each image region aligning a center of the imaging frame;

a lens-driving step of performing a focus operation to drive the lens based on any of the focus evaluation value and the focus evaluation value and the position of a focal point of the lens, thereby meeting the position of the focal point of the lens detected by the focal-point-detecting step to an in-focus position thereof; and an operation-switching step of switching operations in the lens-driving step and the focus-evaluation-value-calculating step based on the autofocus content set by the user interface, thereby achieving a focus operation according to the set content.

7. The autofocus device according to claim 1, further comprising:

a distance measurement sensor that measures a distance to a subject, wherein the control unit performs the focus operation to control the lens-driving unit to drive the lens based on any of the focus evaluation value and the focus evaluation value, the position of a focal point of the lens, and the measured distance result measured by the distance measurement sensor, thereby meeting the position of the focal point of the lens detected by the focal-point-detecting unit to an in-focus position thereof, wherein the control unit controls the lens-driving unit, the distance measurement sensor and the focus-evaluation-value-calculating unit based on the autofocus content set by the user interface, thereby achieving the focus operation according to the set content.

8. The autofocus device according to claim 7, wherein, as the set content, any one of a speed of driving the lens, a size of distance measurement window of the distance measurement sensor, and a restart determination standard as restarting the focusing operation is set.

9. The autofocus device according to claim 7, wherein, as the set content, any one of a lens-drive processing using the measured distance result by the distance measurement sensor and a lens-drive processing without using the measured distance result by the distance measurement sensor is set.

* * * * *